United States Patent [19]
Seki et al.

[11] Patent Number: 5,130,859
[45] Date of Patent: Jul. 14, 1992

[54] VIDEOTAPE RECORDER

[75] Inventors: Yasuo Seki; Tetsuo Kani, both of Kanagawa, Japan

[73] Assignee: Sony Corporation, Tokyo, Japan

[21] Appl. No.: 515,713

[22] Filed: Apr. 27, 1990

[30] Foreign Application Priority Data

Apr. 28, 1989 [JP] Japan ................................. 1-111160
Apr. 28, 1989 [JP] Japan ................................. 1-111161

[51] Int. Cl.$^5$ ........................ G11B 27/02; G11B 5/584
[52] U.S. Cl. ................................. 360/14.1; 360/14.2; 360/19.1; 360/77.13
[58] Field of Search ............... 360/14.1, 10.2, 14.2, 360/19.1, 70, 77.13, 77.12, 73.04, 73.12, 73.13, 73.09

[56] References Cited

U.S. PATENT DOCUMENTS

| | | | |
|---|---|---|---|
| 3,829,892 | 8/1974 | Nagahiro et al. | 360/73.04 |
| 3,851,116 | 11/1974 | Cannon | 360/73.04 |
| 4,358,797 | 11/1982 | Nishijima et al. | 360/14.2 |
| 4,849,831 | 7/1989 | Hino | 360/14.1 |

Primary Examiner—Aristotelis Psitos
Assistant Examiner—Varsha V. Sheladia
Attorney, Agent, or Firm—Lewis H. Eslinger; Jay H. Maioli

[57] ABSTRACT

In a high definition television system (HDTV), a video signal is recorded on and reproduced from oblique and successive parallel tracks on a magnetic tape, and an audio signal is recorded on and reproduced from a plurality of parallel tracks extending in a longitudinal direction of the tape. The tape is transported in its longitudinal direction during recording and reproduction. A tape position adjuster adjusts the position of the magnetic tape in its transport direction, and first and second transducing heads located at positions separated by a predetermined distance which may vary slightly because of manufacturing tolerances are employed for respectively reproducing and recording the audio signal. When the tape is edited, a processor connected to the first transducing head processes a reproduced audio signal and supplies it to the second transducing head, which records it accordingly. A controller responsive to an output signal of the adjuster controls the processor so as to shift the recording timing of the second transducing head as may be necessary to prevent the accumulation of recording timing errors during successive edits of the tape.

7 Claims, 12 Drawing Sheets

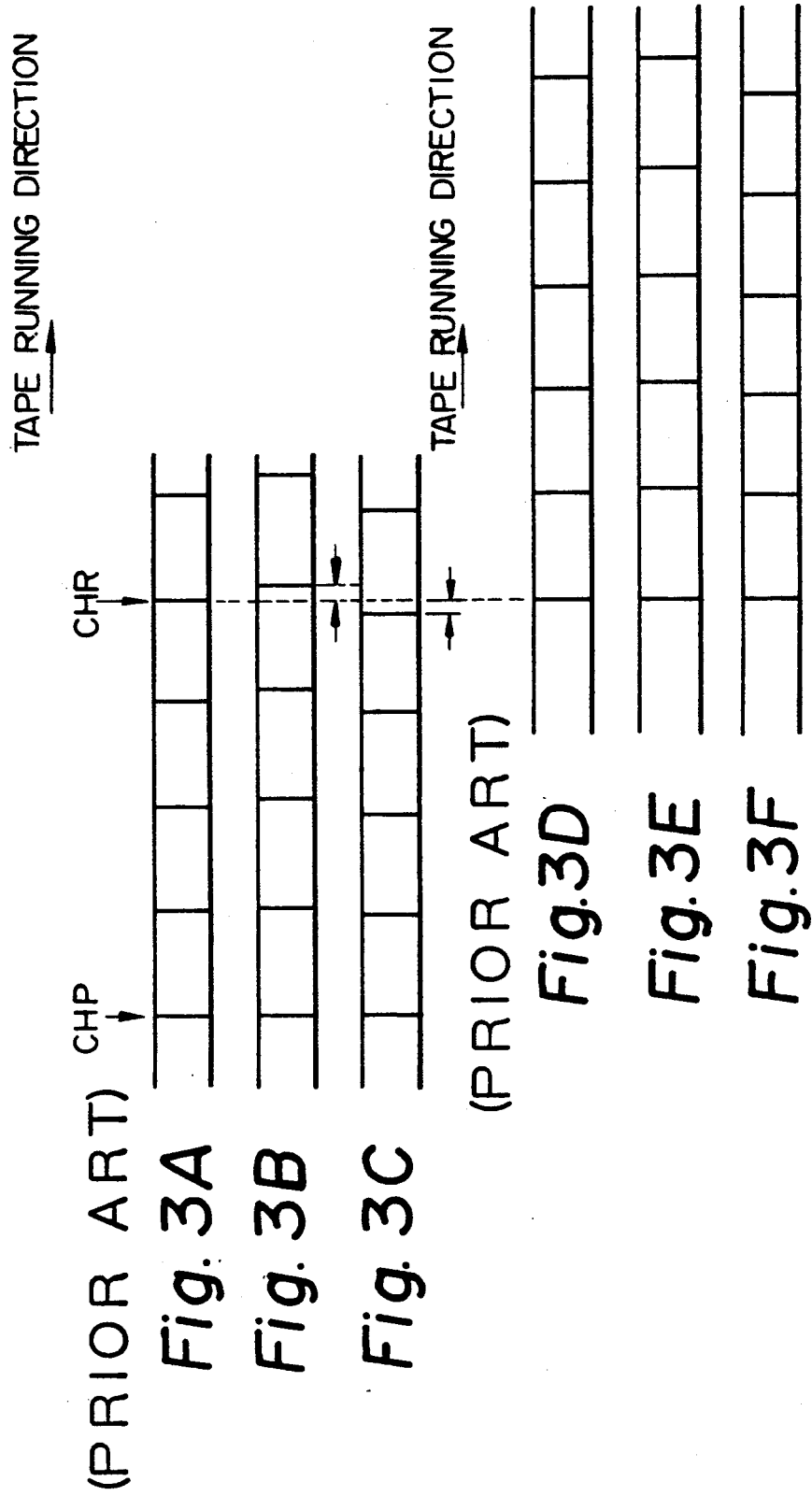

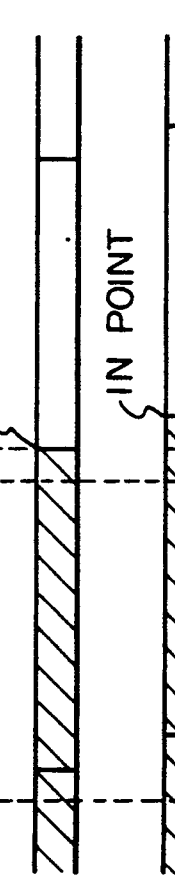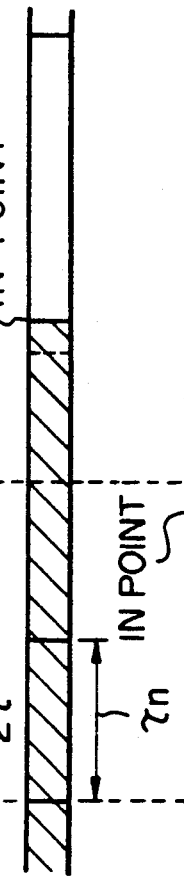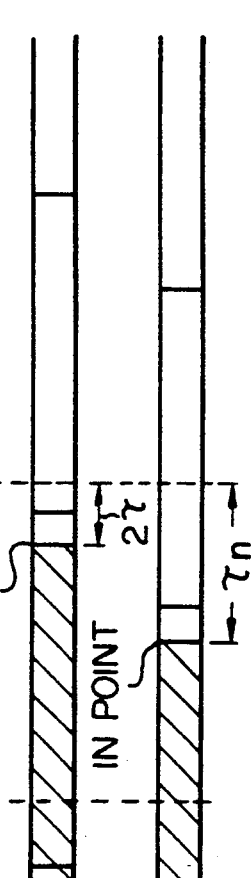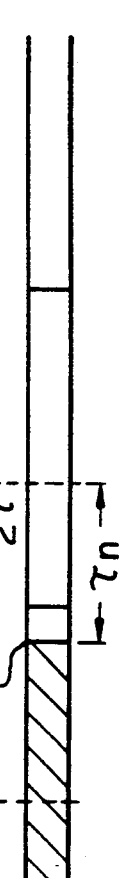

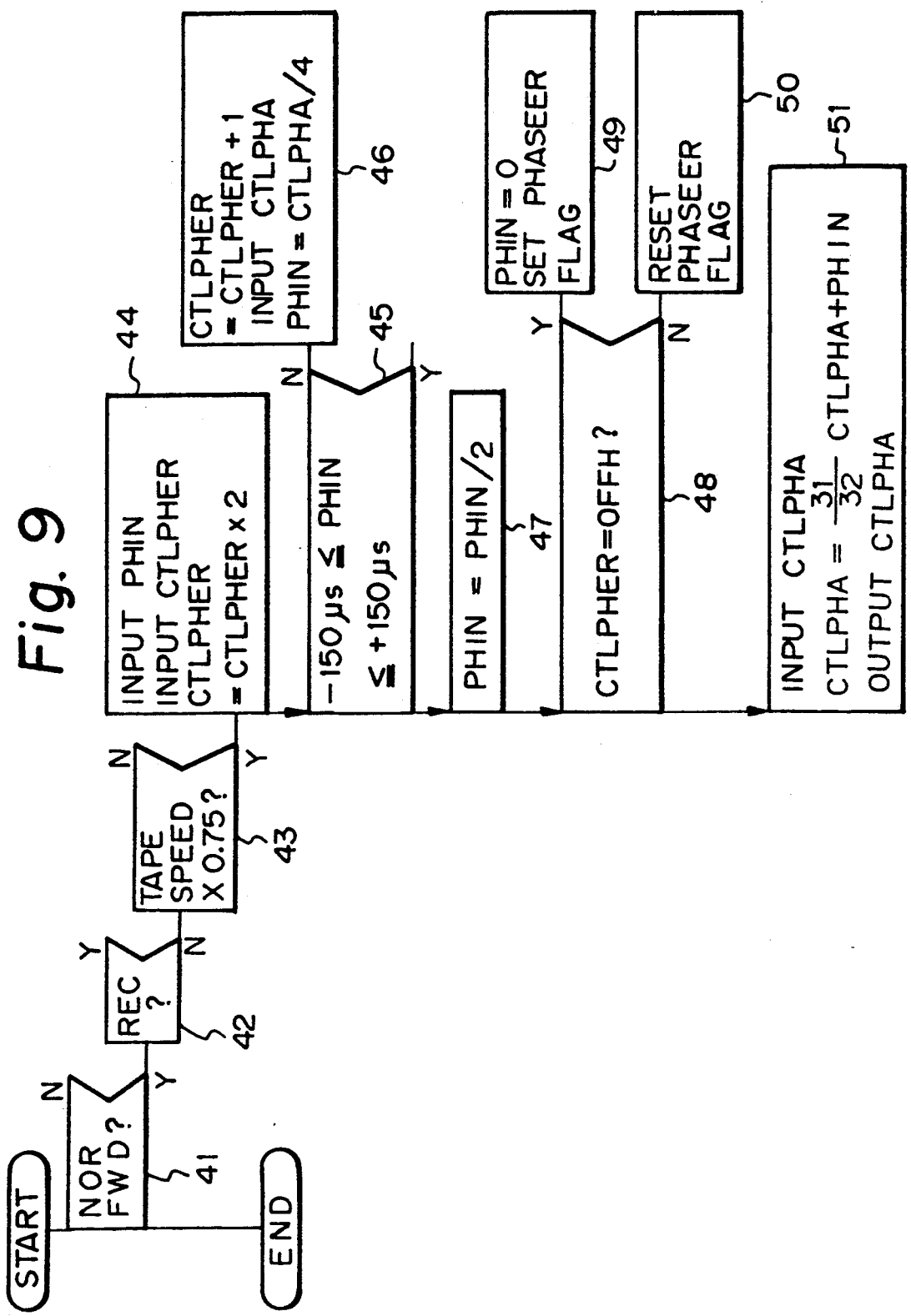

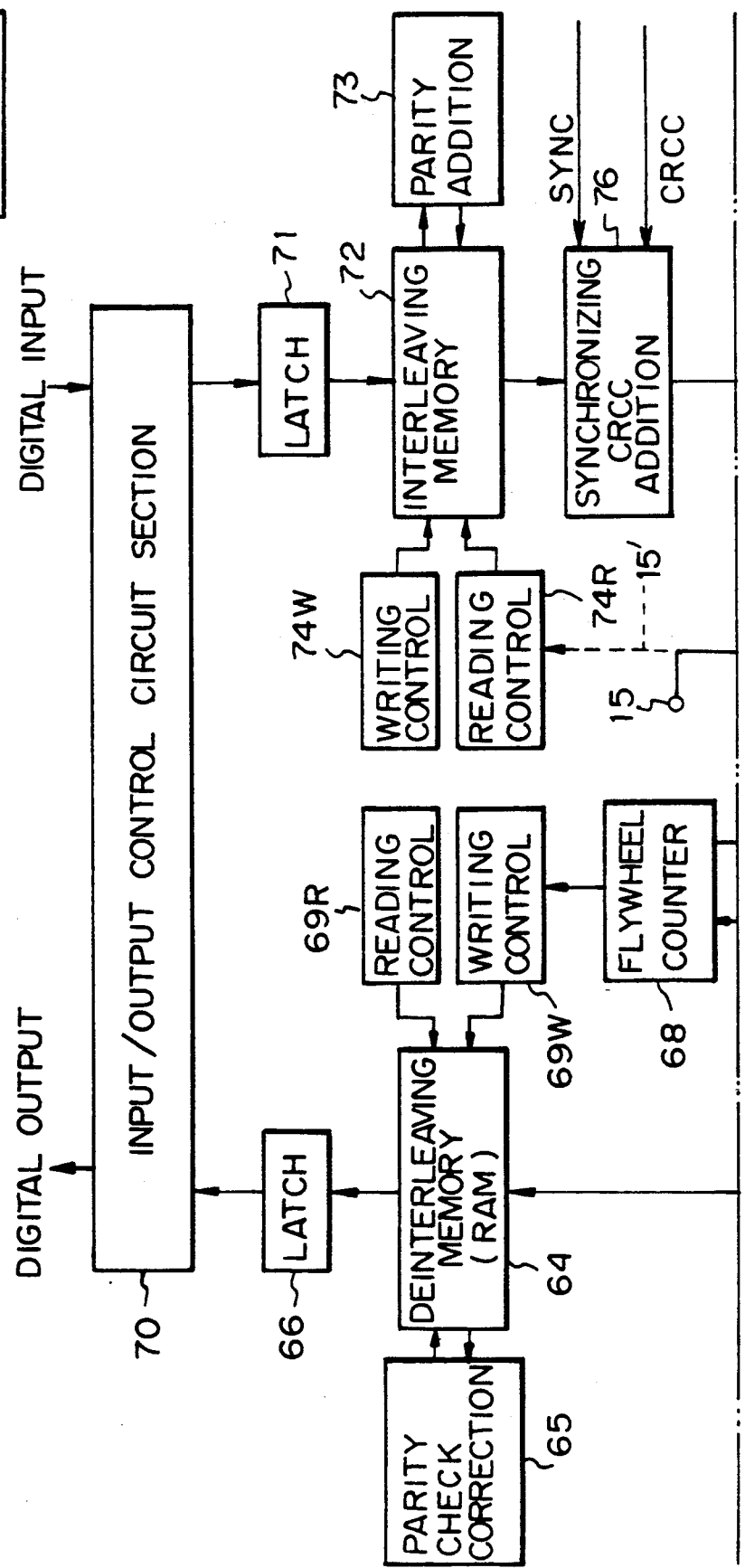

VIDEOTAPE RECORDER

BACKGROUND OF THE INVENTION

1. Field of the Invention

This invention relates to videotape recorders and more particularly to a novel and highly effective videotape recorder usable in a high definition television system (HDTV) and configured to record a video signal on slant tracks and record a PCM audio signal on longitudinal tracks.

2. Description of the Prior Art

In a conventional VTR (videotape recorder), tracking servo is provided in order to enable a rotary head properly to scan slant tracks formed on a magnetic tape. As one form of tracking servo, there is known a system that records on a longitudinal track a tracking control signal that is separated from a recorded video signal and has a frequency equal to the frame frequency. Upon reproduction of the recorded tracking control signal (together with the other recorded signals), the system controls the speed of the magnetic tape so as to establish a predetermined phase relationship between a servo reference signal and the reproduced tracking control signal. That is, the control signal is recorded in order to indicate the position where the rotation phase of a head drum and the frame frequency signal separated from the recorded video signal were properly phase-locked at the time of recording.

For example, in a videotape recorder of a one-inch type C format, the tracking control signal is recorded and reproduced by a single stationary control head 35 as shown in FIG. 1. In FIG. 1, reference numeral 34 designates a drum having a rotary head (not shown) mounted thereon and rotatable at 3600 rpm. A magnetic tape TP is wound helically around the circumferential surface of the drum 34 and transported longitudinally.

A predetermined value is fixed for a distance Wp between a head changeover switching point and the control head 35. A discrepancy between the predetermined value and the actual distance Wp does not cause a tracking error in case of self recording and reproduction, i.e., recording and reproduction by the same VTR. Between different VTRs, however, any discrepancy in the distance Wp gives rise to a tracking error. Therefore, in order to ensure interchangeability between different VTRs, they are adjusted upon shipment so that the distance Wp exhibits, as nearly as possible, the standard value in all sets. This is accomplished by reproducing a standard tape on which the position of the control signal is properly recorded. Variation, if any, in the speed of the magnetic tape TP might seem to invite a deviation in the frequency of the control signal recorded on the tape. However, when the tape is reproduced by a different set, the tape speed as originally recorded is restored by the tracking servo. Therefore, if the distance Wp is constant, no tracking error is produced.

Thus, in the arrangement so configured that the control head 35 is used for both recording and reproduction of the control signal, variation in the speed of the magnetic tape does not cause a tracking error. However, for reasons explained in connection with FIGS. 2, 3A-3F, 4, and 5A-5G, in other arrangements using different and separated heads for respectively recording and reproducing the control signal, any variation in the speed of the magnetic tape TP does cause a tracking error, in the absence of the novel timing correction introduced in accordance with the present invention.

FIG. 2 shows a head placement in a videotape recorder using a rotary head to which the present invention may be applied. The magnetic tape TP drawn away from the drum 34 via a guide is transported at a constant speed in the direction indicated by the arrow A by a capstan 38 and a pinch roller 39. Along the tape path are provided in sequence a playback head 21, erasing head 36, recording head 22 and monitor playback head 37. The recording head 22 records the control signal having a field frequency on the longitudinal tracks, and the playback head 21 reproduces the control signal. The distance Wt between the reproducing head 21 and the recording head 22 is fixed by a format to a predetermined value corresponding, for example, to a two-frame period (53.67 mm).

The recording head 22 is a multichannel head for recording the control signal, PCM audio signal, etc., on tracks parallel to the longitudinal direction of the magnetic tape TP. In order to diminish the width of guard bands and enlarge the recording electric current, a thin-film head is used as the recording head 22. The playback head 21 is a multichannel head for reproducing the control signal, PCM audio signal, etc. In the case of the PCM audio signal, different heads are normally used respectively for recording and playback during editing and at other times. The recording head 22 is not, however, used to reproduce the control signal, since the signal-to-noise ratio of a thin-film head renders it unsuitable for use in reproduction; and during editing, the reproduced control signal would be disordered by a disturbance of the recording electric current of the digital audio signal and would render the tracking servo inoperative. Therefore, it is not advisable to use the recording head 22 to effect reproduction.

Both the playback head 21 and the recording head 22 are compound heads: each includes a head for reproducing or recording the control signal and a head for reproducing or recording the PCM audio signal. In order to refer to these heads individually, the PCM audio signal playback head of the playback head 21 is identified as AHP (Audio Head Playback), and the control signal playback head is identified as CHP (Control Head Playback). Similarly, the PCM audio signal recording head of the recording head 22 is identified as AHR (Audio Head Record), and the control signal recording head is identified as CHR (Control Head Record).

FIGS. 3A to 3F show how variation in the speed of the magnetic tape TP in apparatus configured as in FIG. 2 causes a tracking error. FIGS. 3A, 3B and 3C illustrate phases of the control signal during its playback, whereas FIGS. 3D, 3E and 3F illustrate phases of the control signal during its recording.

When the control signal is recorded, phases thereof at a normal tape speed (FIG. 3D), at a fast tape speed (FIG. 3E) and at a slow tape speed (FIG. 3F) coincide at the position of the recording head CHR. However, phase differences are produced at positions separated from the recording head CHR, and these phase differences are a function of the amount of the separation. When recorded, the control signal recorded at the position of the recording head CHR is phase-locked with a predetermined rotation phase of the drum.

During reproduction, since the tracking servo is activated in each case of a normal tape speed (FIG. 3A), a fast tape speed (FIG. 3B) and a slow tape speed (FIG.

3C), phases of the control signal are brought into coincidence at the position of the reproducing head CHP. However, because of variation in the tape speed, phases of the control signal do not coincide at the position of the recording head CHR, and they cannot be controlled into the same phase-locked condition as recorded. For example, when the variation in the tape speed is ±0.1%, the phase difference at the position of the recording head CHR is ±53.67 μm (+66.7 μs in time). Since the track pitch of the slant video tracks is such that, for example, 16 video tracks are formed in each field period, the above-indicated phase difference of the control signal in case of 16.67 ms/16=1.05 ms causes a tracking error of (66.7 μs/1.05 ms)×100=6.4%. The tracking error causes a dropout in the level of a reproduced RF signal from the video tracks. Additionally, when the distance Wt between the recording head CHR and the playback head CHP is different from a standard value, there is a possibility that the tracking error will be increased.

As indicated above, the control signal is used for a tracking servo in order to enable the rotary head properly to scan the slant video tacks formed on the magnetic tape. Besides this, the PCM audio signal is recorded in the digital audio tracks parallel to the longitudinal control tracks on which the control signal is recorded.

For recording, reproducing and transmitting a digital signal such as a PCM audio signal, it is essential to predetermine a format including sampling frequency, number of bits per sample, etc.

For example, a business-use PCM audio signal recording process of a stationary head type is disclosed in Japanese laid-open patent publication No. 57-36410 and Japanese laid-open patent publication No. 59-104714, both assigned to the assignee of the present application. This PCM audio signal recording process employs a format of 16 bits per sample, which is acceptable for sampling frequencies of 32 kHz, 44.1 kHz, and 48 kHz, and employs a tape recording pattern including a plurality (8 to 48) of digital audio tracks, two analog audio tracks, a time code track and a control track, all formed on a tape in its longitudinal direction. The audio data is divided into blocks each including a predetermined number of samples (for example, 12 samples), and, a block address being added to each block, the audio data is recorded together with a block synchronization signal, etc., on the digital audio tracks.

In the digital VTR in which a digital video signal is recorded on and reproduced from a magnetic tape, an audio signal is also digitally recorded. For example, a VTR for digitally recording a high definition television signal is disclosed in Japanese laid-open patent publication No. 62-199179, assigned to the assignee of the present application. This prior art shows three examples of audio signal recording modes. However, in consideration of the tape running speed being relatively high (about 805 mm/s), recording of a PCM audio signal using a stationary head is proposed in addition to these modes.

FIG. 4 shows relationships between tracks formed on a tape. Tv indicates a video track formed by a rotary head, TA represents a digital audio track formed in the longitudinal direction of the tape, and $T_{CTL}$ shows a control track. On the control track $T_{CTL}$ is recorded a tracking control signal, for example, in field intervals, as shown by vertical lines in the drawing. On the digital audio track TA a PCM audio signal is recorded in sub-blocks together with sub-block addresses at a rate, for example, of 250 sub-blocks per three fields. The phase relationship between the control signal and the PCM audio signal as recorded is properly established on the tape.

Upon VTR reproduction, for purposes of establishing a predetermined phase relationship between an external reference signal and a reproduced control signal, a capstan motor for controlling tape speed is controlled so as to ensure that the video track Tv coincides with the scan orbit of the rotary head. However, tape stretch and variations in mechanical accuracy between different VTRs (manufacturing tolerances) tend to cause a tracking error as indicated by a scan orbit Ts shown by a broken line in FIG. 4. In order to correct the tracking error, the phase of the reproduced control signal is adjusted by a delay circuit. Adjusting the phase of the reproduced control signal is equivalent to slightly shifting the position of the reproducing head in the longitudinal direction of the tape. More specifically, the tracking adjustment implies, in the case of longitudinal tracks, that the position along the tape reproduced in response to the external reference signal is shifted. Therefore, notwithstanding that the tracking adjustment has been effected, upon editing, where a new PCM audio signal is recorded, superimposed on an old PCM audio signal, based on the timing of the reference signal, lines of blocks move by several blocks, causing improper recording. As a result, the interface between the original recorded data and the new data recorded as a continuation thereof is not "seamless." When the spliced portion of tape is reproduced, because of the improperly shifted rows of blocks, several blocks of data are omitted before data playback is restored, and there is a substantial likelihood that uncorrected errors will result.

In order to overcome these problems, Japanese patent application No. 63-93246, assigned to the assignee of the present application, discloses control of the phase of recorded data on the basis of a comparison output which is obtained by comparison of a reference block address signal with a block address of a reproduced digital signal.

The prior proposed system involves the disadvantage, however, that it is not known whether an advance or a delay of a reproduced block relative to a reference block is caused by a tracking adjustment or by an off-phase in a previously recorded PCM audio signal (base recording). Therefore, in case of recording signals in successive superimposition for cut editing, errors between an ideal value and an actual value of the distance between a reproducing head and a recording head of a PCM audio signal are accumulated in successive edits as shown in FIGS. 5A to 5G. The ideal value of the interhead distance is a value so adjusted as not to disorder the rows of data blocks upon editing in which reproduction is effected without any tracking adjustment and a new PCM audio signal is recorded.

FIG. 5A shows positional relationships of a playback head AHP and recording heads with respect to the digital audio track TA. The recording head shown at $AHR_1$ is at a proper distance from the playback head AHP. The recording head shown at $AHR_2$ is less distant than the proper distance, and the recording head shown at $AHR_3$ is more distant than the proper distance. In case of using the recording head $AHR_2$ more distant than the proper distance, when new data shown by oblique lines is recorded on a base recording (original data) in continuation with and subsequent to the IN point, the splice becomes discontinuous as shown in FIG. 5B.

When reproducing by means of the magnetic head recorded with signals in this condition and further recording new data on the base which has been spliced once already with a deviation $\tau$, the earlier-disclosed deviation correcting system produces a deviation $2\tau$ twice as great, as shown in FIG. 5C. From here on, in the same fashion, when new data is further spliced with a base which has already been spliced (n−1) times, a deviation $\tau$ n, i.e. n times the deviation per one splice, is accumulated as shown in FIG. 5D.

In case of using the recording head $AHR_2$ less distant than the proper distance, when new data shown by oblique lines is recorded on the base in continuation with and subsequent to the IN point, the splice is discontinuous as shown in FIG. 5E. Also in this case, when new data is further spliced with a base which has been spliced once already, a doubled deviation $2\tau$ is produced as shown in FIG. 5F, and when new data is spliced with a base which has already been spliced (n−1) times, the deviation $\tau$n which is n times the deviation per one splice is accumulated as shown in FIG. 5G.

OBJECTS AND SUMMARY OF THE INVENTION

It is, therefore, an object of the invention to provide a videotape recorder that prevents a tracking error caused by a variation in the tape speed when recording and playback of a control signal are performed by different heads.

A further object of the invention is to provide a videotape recorder that prevents deviation of an edit point when audio data is reproduced with a deviation relative to a reference signal as a result of a tracking adjustment.

A still further object of the invention is to provide a digital signal recording and playback apparatus that prevents a deviation caused by an improper distance between a recording head and a playback head from being accumulated when editing of the same section of tape is effected repeatedly.

In accordance with one aspect of the invention, there is provided apparatus for recording a video signal and an audio signal on a magnetic tape and for reproducing the video signal and the audio signal therefrom, said video signal being recorded on oblique and successive parallel video tracks formed on said magnetic tape by at least one video head moving in scan orbits and said audio signal being recorded on at least one audio track formed in a longitudinal direction of said tape, said apparatus comprising: adjusting means for effecting a speed adjustment of said magnetic tape in its longitudinal direction so as to ensure that, during reproduction of the video signal, the video tracks coincide with the scan orbits; first and second transducing heads located at positions separated from each other in the longitudinal direction of said tape by a given distance for respectively reproducing and recording the audio signal, said given distance being nominally predetermined but subject to variation; processing means connected to said first transducing head for processing an audio signal reproduced from an original recording and for supplying the same to said second transducing head for making a new recording to be spliced to said original recording as a continuation thereof; and control means responsive to said adjusting means for controlling said processing means so that recording of said reproduced audio signal by said second transducing head can be shifted to maintain a prescribed relation between said original recording and said new recording notwithstanding a variation in said given distance.

In accordance with another aspect of the invention there is provided a servo system for controlling transport of a record medium on which video, audio, and control track signals are recorded and from which the video, audio, and control track signals are reproduced, said servo system comprising: a first head for reproducing said control track signal at a first location; a second head for reproducing said control track signal at a second location, said second location being at a given distance from said first location, said given distance being nominally predetermined but subject to variation; a tracking control device for controlling transport of said record medium when said video signal and said control track signal are out of synchronization; and means connected to said first and second heads for generating a mean value of a phase difference between the control track signal as reproduced by said first and second heads and for supplying the mean value as a control signal for controlling said transport of said record medium.

The combination of features of this invention that are new are set forth with particularity in the appended claims. The invention and further objects and advantages thereof may, however, best be understood by reference to the following detailed description of the preferred embodiments thereof, in conjunction with the accompanying drawings.

BRIEF DESCRIPTION OF THE DRAWINGS

FIGS. 3A to 3F are timing charts for use in explanation of a tracking error that arises in the apparatus of FIG. 2 as a result of different tape transport speeds;

FIGS. 5A to 5G are schematic views for use in explanation of error accumulation during editing of a PCM audio signal, despite the tracking adjustment explained in connection with FIG. 4;

FIG. 9 is a PAD flowchart for use in an explanation of averaging of phase differences;

DESCRIPTION OF THE PREFERRED EMBODIMENT

An embodiment of the invention is described below with reference to the drawings.

Figure 1:
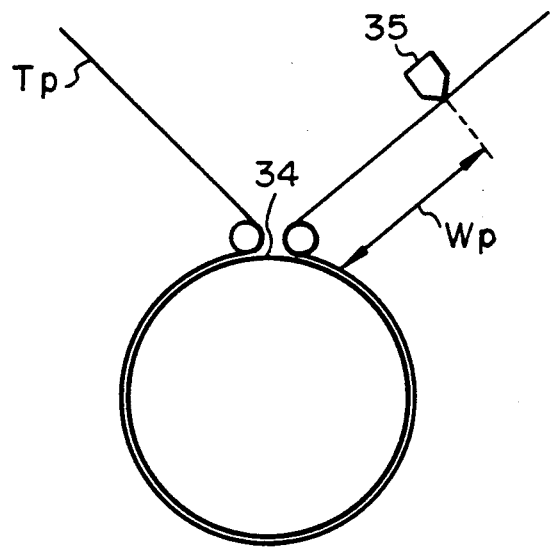
FIG. 1 is a schematic view showing head placement in a conventional videotape recorder.
Figure 2:
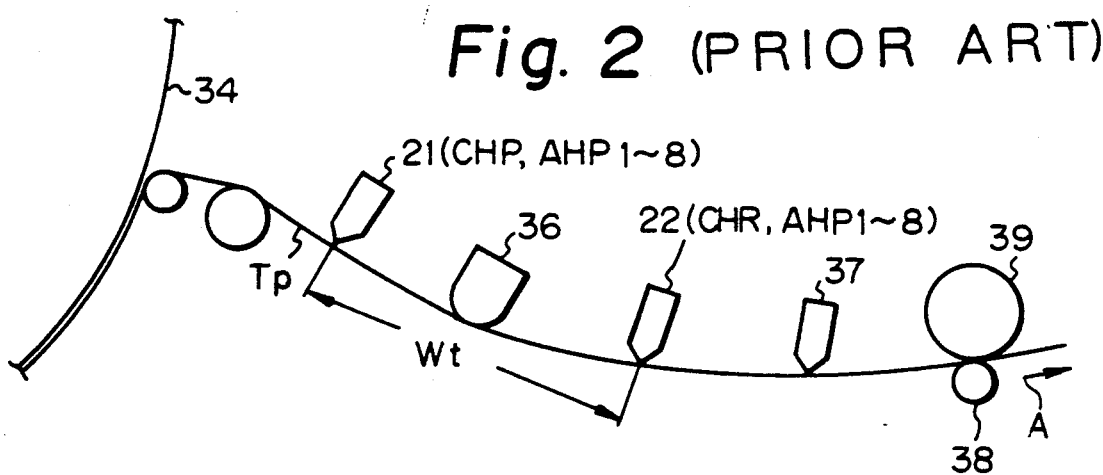
FIG. 2 is a schematic plan view for use in explanation of head placement in a conventional videotape recorder to which the invention may be applied.
Figure 4:
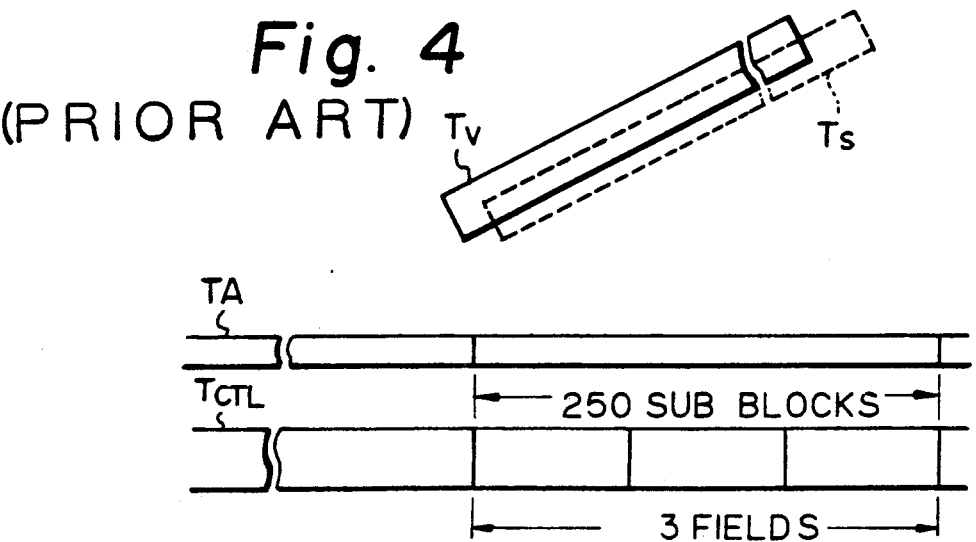
FIG. 4 is a schematic view for use in explanation of a tracking adjustment for correction of the tracking error shown in FIGS. 3A-3F.

In this embodiment, a rotary head is used to record and reproduce a high definition television signal, and a stationary head is used to record and reproduce an accompanying PCM audio signal. As in FIG. 2, playback head 21 for reproducing signals such as a control signal and a PCM audio signal recorded in the longitudinal direction of the tape and a recording head 22 for recording these signals are located at positions separated from each other by a given distance Wt which is nominally predetermined but subject to variation.

A thin-film head is employed as the recording head 22 in order to reduce the width of the guard band interposed between different tracks and enlarge the recording electric current. Such a thin-film head is not suitable for use as a playback head because the signal-to-noise ratio of its reproduced output is too low.

Figure 8:
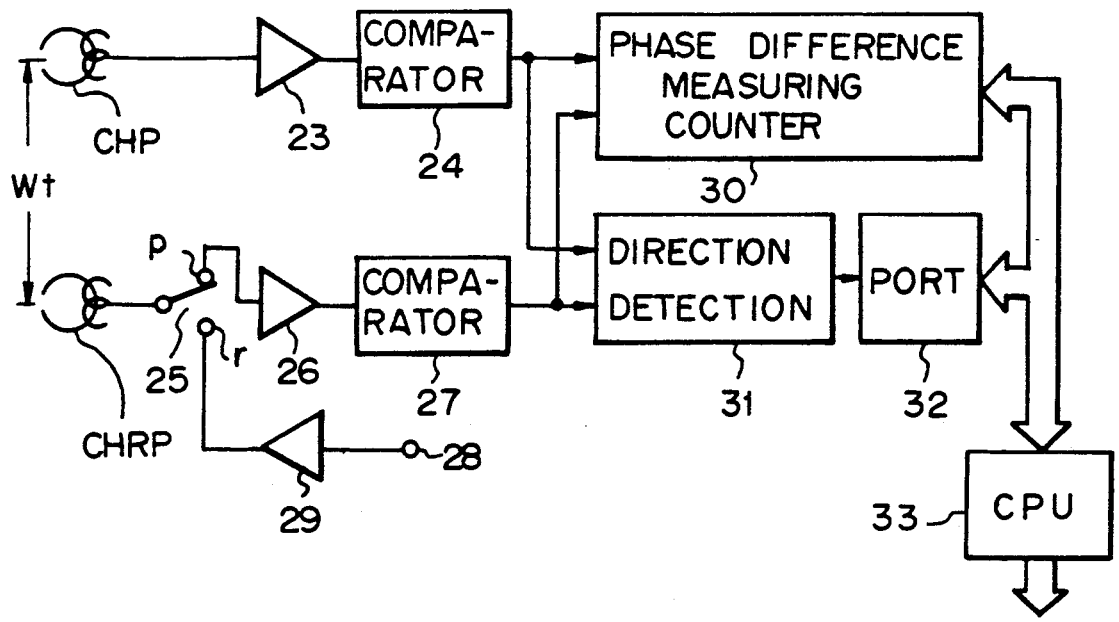
FIG. 8 is a block diagram showing an arrangement for detecting a phase difference.

Besides, in editing the PCM audio signal, a crosstalk component of the recording current for the PCM audio track leaks into the reproduced control signal and disturbs it. Therefore, the playback head 21 and the recording head 22 are provided independently. However, the recording head 22 is used for reproduction of a control signal, as well as for purposes of pseudotracking servo at the position of the recording head 22, as will be described later. The recording head 22, however, is never used to reproduce the PCM audio signal. In order to distinguish their natures clearly, heads in the playback head 21 for reproducing a PCM audio signal of, for example, eight channels are referred to as $AHP_1$ through $AHP_8$, and a head for reproducing the control signal is referred to as CHP. Similarly, heads in the recording head 22 for recording the PCM audio signal are referred to as $AHR_1$ through $AHR_8$, and a head for recording and reproducing the control signal is referred to as CHRP (FIG. 8).

Figure 6:
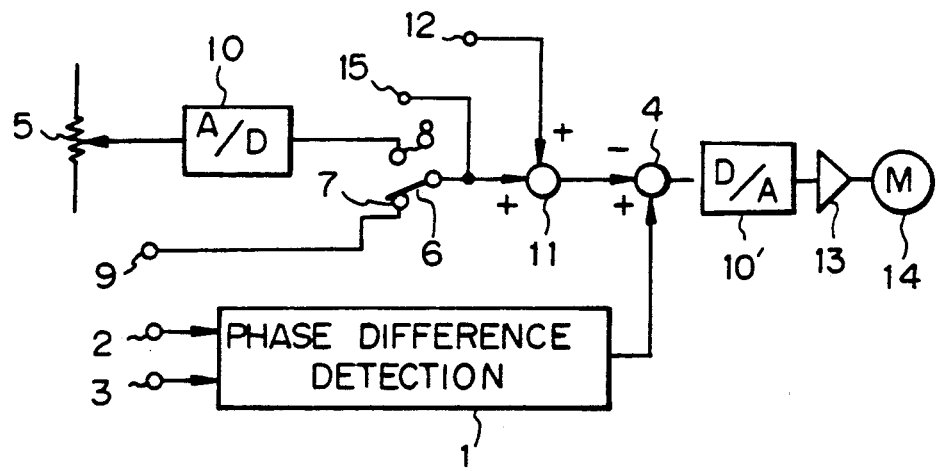
FIG. 6 is a block diagram showing an arrangement related to tracking servo in an embodiment of the invention.

FIG. 6 shows an arrangement of a tracking servo in the same embodiment. This is a digital tracking servo circuit using a microcomputer. In FIG. 6, a servo reference signal from an input terminal 2 and a reproduced control signal from an input terminal 3 are supplied to a phase difference detector shown at 1. The reproduced control signal is reproduced from a control track by the playback head CHP. Although not shown, the drum phase servo uses the same servo reference signal as does the capstan phase servo. In the phase difference detector 1 a phase difference between the servo reference signal and the reproduced control signal is detected, and a phase error signal is generated. The tape error signal is supplied to a subtractor 4.

Reference numeral 5 denotes a gain control for tracking adjustment, and a switch circuit 6 is provided in association with the gain control 5. The control 5 and switch circuit 6 can be controlled in any suitable way, for example respectively by hand and automatically. A preset value from a terminal 9 is supplied to one input terminal 7 of the switch circuit 6, and a digital value indicative of an output of the gain control 5 is supplied to the other input terminal 8 of the switch circuit 6 via an analog-to-digital (A/D) converter 10. When tracking adjustment is not effected, for example in the case of self recording and reproduction, the terminal 7 of the switch circuit 6 is selected, and the preset value is obtained from the switch circuit 6. As indicated above, the reproduced control signal is supplied to the phase difference detector 1 via the input terminal 3. When tracking adjustment is effected (for example, upon reproducing a tape recorded by a different VTR) in order to compensate for any variations between the different VTRs, the switch circuit 6 selects the terminal 8, and a digital value indicative of the output voltage of the gain control 5 is obtained from the switch circuit 6. In this case, although not shown, the reproduced control signal having a delay amount corresponding to the output voltage of the gain control 5 and passing through a variable delay circuit is fed to the phase difference detector 1.

The output signal (reference signal) of the switch circuit 6 is supplied to an adder 11, and is also supplied to an output terminal 15 for the purpose of correcting the recording timing of the PCM audio signal during editing. The average of the phase difference between the control signal as reproduced by the playback head CHP (as described later) and the control signal as reproduced by the record/playback head CHRP is supplied from a terminal 12 to the adder 11. The adder 11 supplies its output signal to the subtractor 4. An output signal of the subtractor 4 is converted into an analog signal by a digital-to-analog (D/A) converter 10 and supplied to a capstan motor 14 via a drive amplifier 13. The tracking servo circuit shown in FIG. 6 has the same arrangement as the conventional circuit except the feature that the averaged phase difference is added to the reference signal by the adder 11. This difference is significant, since it enables the apparatus to maintain a prescribed spatial and temporal relation between the original recording and a new recording forming a splice at an edit IN point.

Figure 7:
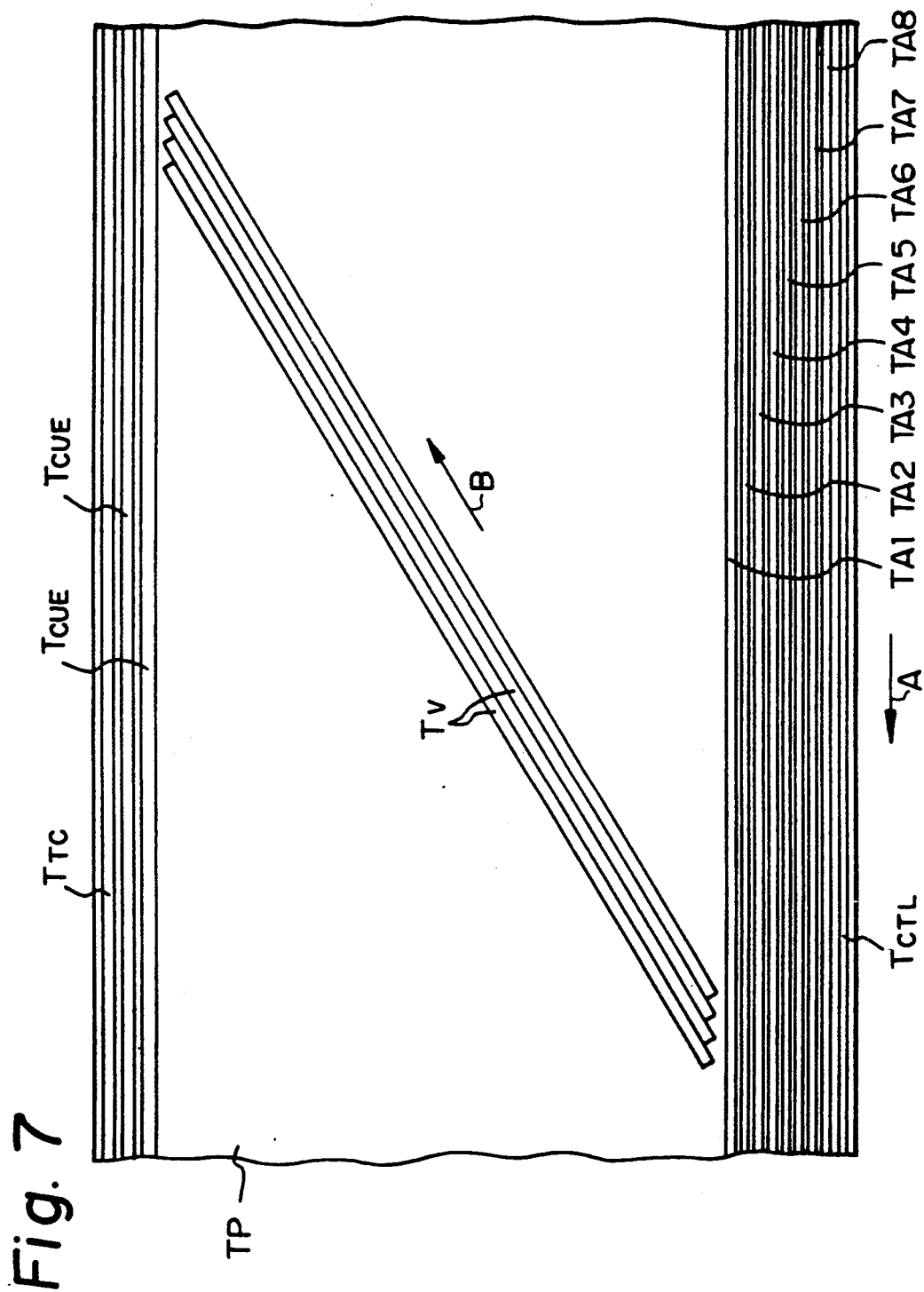
FIG. 7 is a schematic view showing a pattern of tracks on a tape.

FIG. 7 shows a pattern of tracks in the same embodiment. In FIG. 7, eight audio tracks $TA_1$ to $TA_8$ are formed in parallel relationship along the running or longitudinal direction (direction of the arrow A) of the magnetic tape TP. In contrast, a high definition television signal is recorded by the rotary head in the form of slant video tracks Tv. The direction of the arrow B in FIG. 7 indicates the running direction of the rotary video head with respect to the magnetic tape TP. On the magnetic tape TP are further provided a time code track $T_{TC}$, a control track $T_{CTL}$ and a cue track $T_{CUE}$ each extending in the longitudinal or tape running direction (direction of the arrow A).

FIG. 8 is useful in explaining the phase difference detector for generating the signal supplied to the terminal 12 in FIG. 6. CHP indicates a playback head for reproducing the control signal, and CHRP designates the record/playback head for recording and reproducing the control signal. An output signal of the playback head CHP is supplied to a comparator 24 via an amplifier 23, and its waveform is shaped by the comparator 24. A reproduced signal of the record/playback head CHRP is supplied to comparator 27 via a playback terminal p of a record/playback switch 25 and an amplifier 26. A recording control signal of a field frequency derived from a synchronizing signal separated from a recorded video signal is supplied to a record terminal r of the record/playback switch 25 via a terminal 28 and an amplifier 29. The playback head CHP and the record/playback head CHRP are located at positions separated by the predetermined distance Wt as described above in conjunction with FIG. 2.

The playback head CHP and the record/playback head CHRP are disposed at the same positions as the respective record/playback heads $AHR_1$ to $AHR_8$ and playback heads $AHP_1$ to $AHP_8$ that record and reproduce the digital audio signal. Therefore, during an insert edit, crosstalk of the recording current of the PCM audio signal makes it difficult for the record/playback head CHRP to reproduce the control signal in a good condition. In this connection, an average value of phase differences obtained before the IN point is maintained during the insert edit.

The reproduced control signals, which have been waveform-shaped by the comparators 24 and 27, respectively, are supplied to a phase difference measuring counter 30 and a direction detector 31. A digital value corresponding to the phase difference is obtained from the phase difference measuring counter 30. The direction detector 31 refers to the control signal reproduced by the playback head 21 and detects whether the phase of the control signal reproduced by the record/playback head CHRP is ahead or behind. A detection signal of the direction detector 31 is supplied to a CPU 33 via an input port 32. The CPU 33 averages the phase differences and produces averaged phase difference data. The averaged phase difference data is supplied to a servo CPU, which performs the processing shown in FIG. 6.

FIG. 9, which is a flowchart called PAD, illustrates the averaging effected by the CPU 33. PHIN ("Phase In") indicates a phase difference input from the phase difference measuring counter 30, CTLPHA ("Control Phase Average") refers to an averaged phase difference output, CTLPHER ("Control Phase Error") denotes a phase difference input of a window over register, and PHASEER ("Phase Error") shows a phase difference error status output.

First of all, it is determined at step 41 whether or not the present status is a normal forward operation. If not, the program ends. When the normal forward operation is detected, it is determined at step 42 whether or not the operation is in the recording mode. If it is in the recording mode, the program ends. If it is not the recording mode, it is determined at step 43 whether or not the tape speed equals or exceeds 0.75 times the normal speed. If the tape speed does not equal or exceed 0.75 times the normal speed, the program ends. If the tape speed equals or exceeds 0.75 times the normal speed, the phase difference is entered at step 44.

The entered phase difference is examined to determine whether or not it is in the range of $\pm 150$ $\mu s$ (step 45). If it is in this range, which means that the phase difference is not too large, the program goes to step 47. If it is not in this range, which means that the phase difference is too large, it first undergoes processing as indicated at step 46. At step 46, $+1$ is added to CTLPHER, and a value which is one fourth the averaged phase difference is used as the phase difference input PHIN.

At step 47, the phase difference input is divided by 2. At the next step 48, it is determined whether or not the value of CTLPHER is hexadecimal (OFF) ($=256$). If this condition is established, the phase difference input is regarded as zero, and a phase difference error flag is set at step 49. In contrast, when the hexadecimal (OFF) condition of CTLPHER is not established, the phase difference error flag is reset at step 50. In either case, at step 51, a value which is an averaged phase difference CTLPHA is obtained by weighing and adding the preceding value and the new phase difference input. The averaged phase difference CTLPHA is supplied as an output. The program then ends.

The invention is not restricted to the average processing of FIG. 9 using the CPU. For example, the invention may employ an arrangement in the form of an analog capstan servo circuit and may perform analog average processing using a time constant circuit.

This invention can prevent a tracking error even under a variation in the tape speed relative to the standard value in an arrangement where the recording head and the playback head are located at distant positions.

Next the processing of the PCM audio signal is explained.

As will be described later, in this embodiment, the PCM audio signal is divided into blocks each including a predetermined number of words, and an error correction coding processing is performed, taking the block as a delay unit of an interleave. Additionally, one block (record block) of a recording format is formed, and a block address is added to each record block.

Figure 10B:
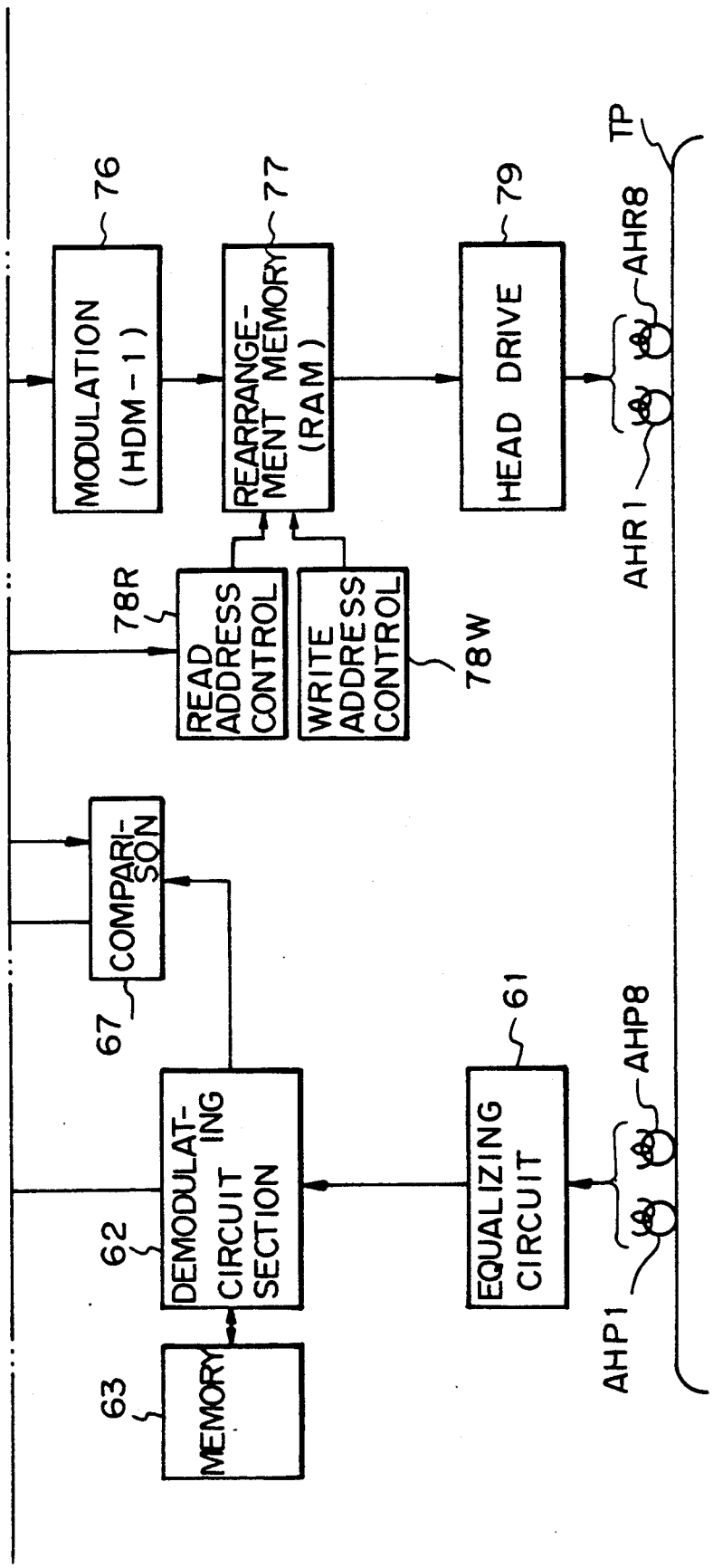
FIG. 10 consisting of FIGS. 10A and 10B, is a block diagram showing an arrangement related to processing of a PCM audio signal in an embodiment of the invention.

In FIG. 10, which consists of FIGS. 10A and 10B and shows the entire arrangement of this embodiment, PCM audio signal playback heads $AHP_1$ through $AHP_8$ for eight channels, for example, scan eight audio tracks $TA_1$ to $TA_8$, respectively, formed on a magnetic tape TP.

Signals from the playback heads $AHP_1$ to $AHP_8$ are sent to a demodulating circuit 62 via a reproduction equalizing circuit 61, so that signal processing, such as demodulation of HDM-1 modulation or other digital modulation, CRC checking, synchronous separation, etc., is performed in the demodulating circuit 62. A memory 63 is connected to the demodulating circuit 62. A demodulated digital signal from the demodulating circuit 62 is processed for error correction by a random access memory (RAM) 64 in a deinterleave processing circuit and by a parity check correcting circuit 65, and it is sent to an input/output control circuit section 70 via a latch circuit 66. In the demodulating circuit section 62, the block address of the reproduced block is also reproduced, and the reproduced block address is sent to a comparing circuit 67 for comparison with a count value from a so-called flywheel counter 68. The flywheel counter 68 is a block address counter used to maintain the continuity of the reproduced block address. More specifically, since the writing of data into the deinterleave memory 64 is effected using the reproduced block address, an output from the flywheel counter 68 is sent to a write control circuit 69W and written into the proper address of the memory 64 so as to be used when the reproduced block address is lost because of a dropout, etc. The data written into the memory 64 is read-controlled by a reading address control circuit 69R. The PCM audio signal fed to the input/output control circuit 70 undergoes processing including level adjustment, delay, interpolation, muting, etc., and is taken out as an input to a D/A converter or as a digital-out output, as may be desired.

Further, a digital input obtained from an A/D converter or PCM audio signal (also referred to as a digital-in input), or the like, is supplied to the input/output control circuit section 70 as an audio signal to be recorded.

The PCM audio signal is supplied via a latch circuit 71 to a random access memory (RAM) 72 for interleave processing and to a parity adding circuit 73 for error correction coding processing. The writing of data into the interleave memory 72 is effected by a writing control circuit 74W and the reading of data out of the memory 72 is effected by a reading control circuit 74R. The data read out of the interleave memory 72 is sent to a digital modulation circuit 76 via an adding circuit 75 for adding a synchronizing signal and a cyclic redundancy check (CRC) code. In the digital modulation circuit 76, the signal is modulated on the basis, for example, of HDM-1 modulation processing, and it is sent to a rearrangement random access memory (RAM) 77, where it undergoes a data conversion that renders it suitable for pulse-train-mode recording, as will be described later. The writing of data into the memory 77 is effected by a write control circuit 78W, and the reading of data out of the memory 77 is effected by a read control circuit 78R. The data read out of the rearrangement memory 77 for pulse-train-mode recording is sent to the digital audio signal recording heads, for example, $AHR_1$ to $AHR_8$ for eight channels, via a head drive circuit 79, and it is recorded on the magnetic tape TP in the form of the audio tracks $TA_1$ to $TA_8$ of FIG. 7.

In the tracking servo circuit shown in FIG. 6 referred to above, the tracking adjustment data taken out at the output terminal 15 corresponds to the phase difference between the reference signal of the field frequency and the reproduced control signal. The tracking adjustment data is used to ensure a seamless interface between the original and new audio recordings: i.e., to prevent a block deviation at an edit point during editing in which a new PCM audio signal is recorded as a continuation of an old PCM audio signal. In other words, a relation which is both spatially and temporally prescribed is maintained between the original and new audio recordings notwithstanding a possible variation in the nominally predetermined distance Wt between the reproducing and recording heads. In this embodiment, a deviation for a length shorter than the length of the recording block (for example, for a length equal to 1/18 of a block) is shown by the tracking adjustment data. The delay of the PCM audio signal to be recorded is controlled as a function of the amount of the deviation. FIG. 10 shows how this can be accomplished. As shown by a broken line 15' in FIG. 10, the delay between writing and reading may be controlled by the interleave processing memory 72 in response to a tracking adjustment data signal applied to a reading control 74R. Alternatively, after reading out the PCM audio signal from the interleave memory 72, the delay may be controlled using another memory. This embodiment employs the latter process, and the tracking adjustment data signal is applied to the read address control circuit 78R. In the rearrangement random access memory (RAM) 77 for pulse-train-mode recording, the reading is controlled using the tracking adjustment data.

Figure 11:
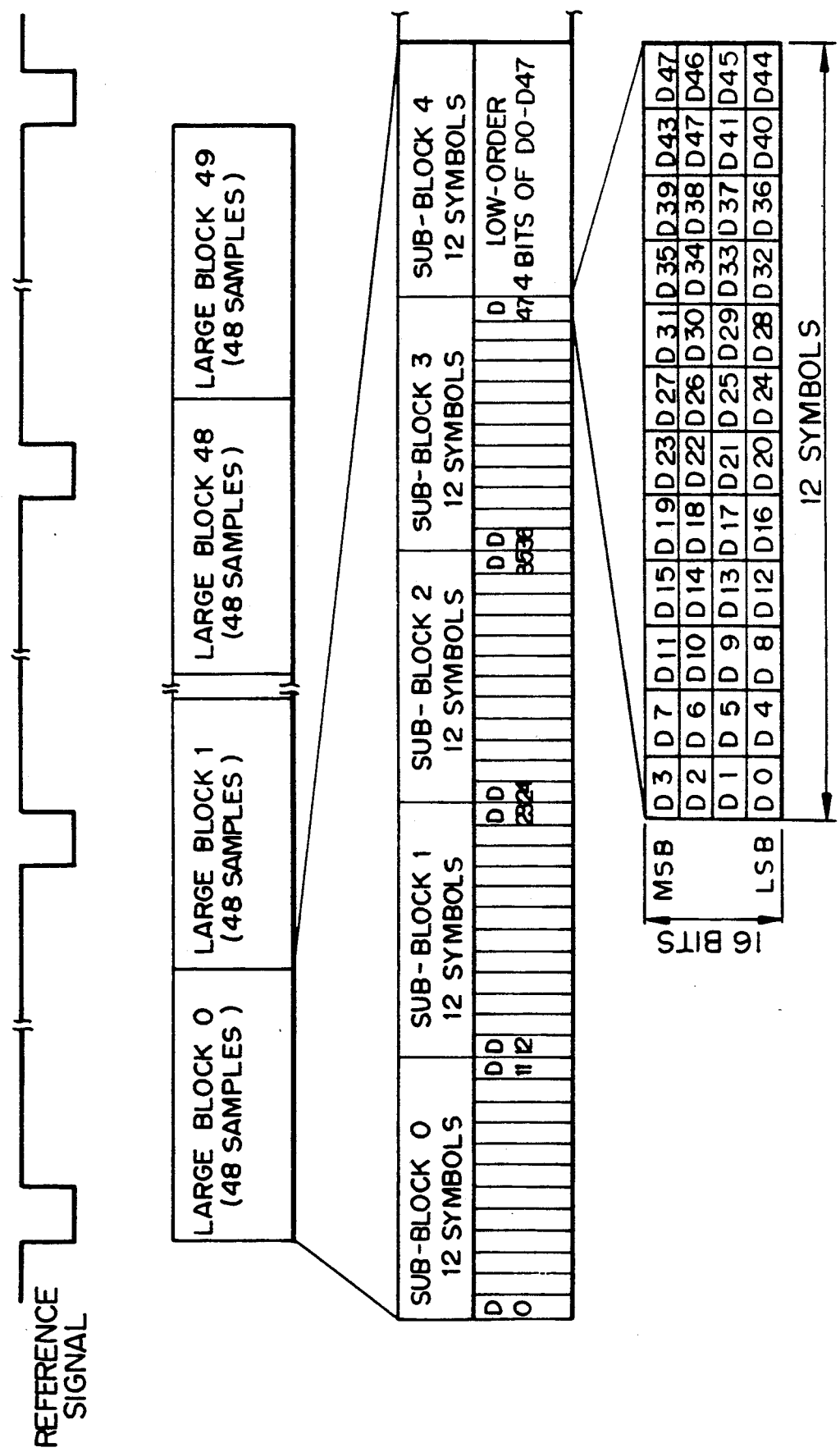
FIG. 11 is a schematic line view showing a data format upon dividing audio data into blocks.
Figure 12:
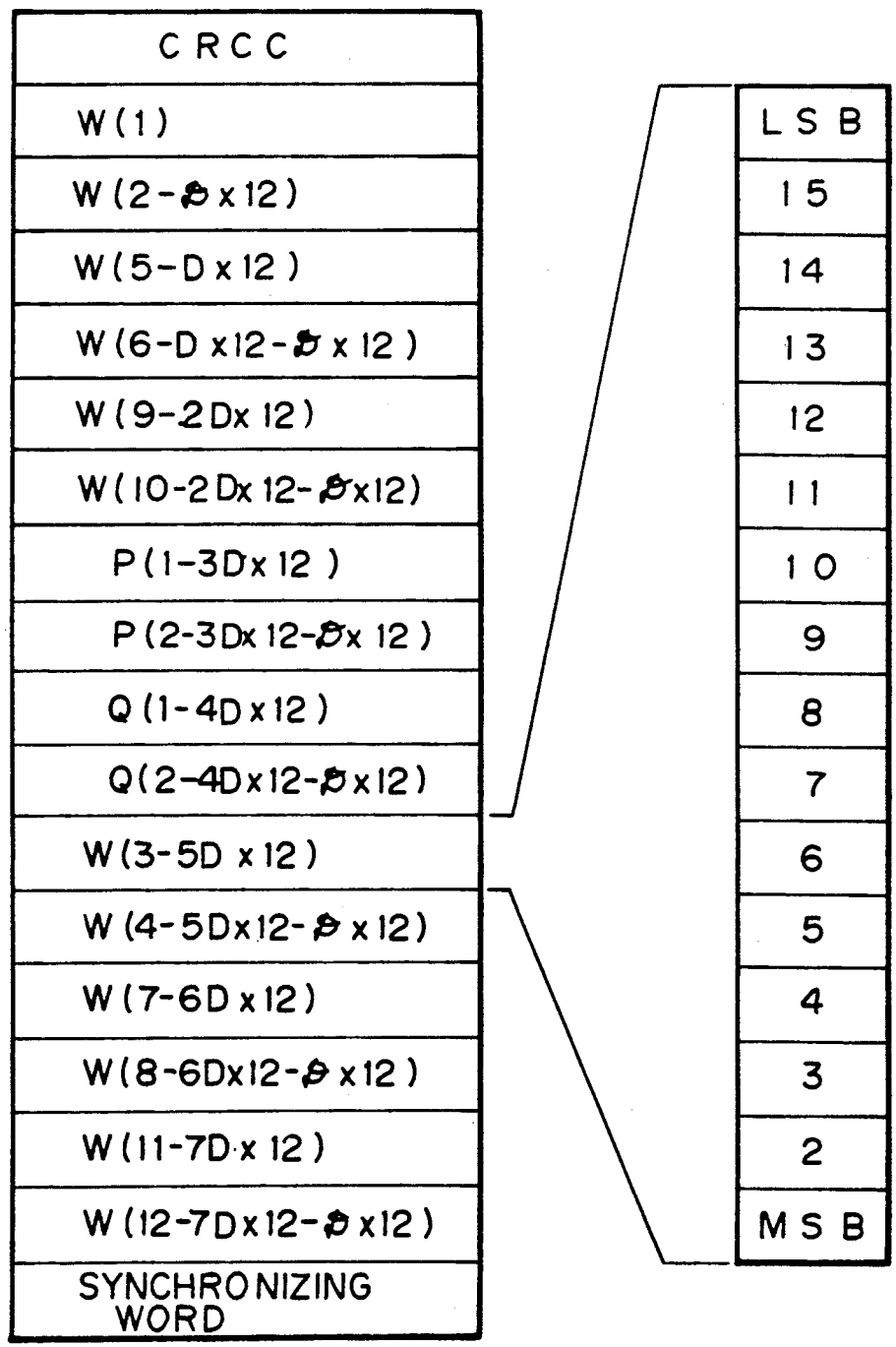
FIG. 12 is a schematic view showing a recording format of the audio data in one block.

FIGS. 11 and 12 show a data format of the PCM audio signal to be recorded and reproduced by the stationary head.

In FIG. 11, 50 large blocks of the PCM audio data are allotted to three field periods of the high definition television signal, and 48 samples each having a word length of 20 bits are allotted to each large block. That is, 2400 samples are present in three fields, and 800 samples are present in each field. Since the field frequency of the high definition television signal is 60 Hz, the sampling frequency of the audio signal is 48 kHz. One large block consists of five subblocks, and each sub-block is made of 12 symbols of data having 16 bits in one symbol. When indicating here successive sub-blocks in the large block by 0 to 4 in sequence and indicating 48 samples of data by D0 to D47 in sequence, respective upper significant 16 bits of data of the sample data D0 to D47 are disposed in sequence in the leading four sub-blocks 0 to 3 ($12 \times 4 = 48$ symbols), and respective lower significant four bits of the sample data D0 to D47 are disposed in sequence in the last subblock 4. Thus the sample data of the word length of 20 bits is divided into upper significant 16 bits and lower significant 4 bits, and respective upper significant 16 bits of 48 samples are allotted to and disposed in four blocks and 48 symbols in the large block of 60 symbols, whereas respective lower significant four bits of the same 48 samples are allotted to and disposed in 12 symbols of the remaining sub-block. Additionally, each symbol of the data format having the aforenoted arrangement undergoes an error correction coding, one block being the delay unit of the interleave processing.

Such an error correction coding processing is explained below. The 12 symbols of each sub-block of FIG. 11 are designated as words W(1) TO W(12) in sequence. These 12 symbols are divided into a group of odd-number words W(1), W(3), ..., W(11) and a group of even-number words W(2), W(4), ..., W(12). First parity words P1 and P2 are generated and added to the groups, respectively. Interleave processing is performed for each of the odd-number and even-number data groups by giving them predetermined delays. Afterwards, respective second parity words Q1 and Q2 are generated and added. Further, respective data are delayed by predetermined amounts, and an interleave processing is done also between the odd-number group and the even-number group to obtain a data group which has been processed with error correction coding.

The output data processed by error correction coding is in the form of 16 symbols in each sub-block, 8 symbols being in the odd-number group and 8 symbols being in the even-number group. Each group includes P and Q parities added thereto.

Subsequently, when the output data (16 symbols) corresponding to one sub-block after being processed with error correction coding is actually recorded, a record block as shown in FIG. 12 is formed. More specifically, a synchronizing signal word corresponding to 16 bits is disposed in the leading position of the record block, and the even-number data and the odd-number data are disposed in alternate sequence thereafter. The P and Q parities are disposed in respective positions of the central four symbols of the record block, and a CRC code, which is an error monitoring code, is disposed at the end. As FIG. 12 illustrates, the sequence of 16 symbols of data between the synchronizing signal word and the monitoring CRC code as well as the parity portions is established as follows:

$W(12 - 7D \times 12 - \theta \times 12)$
$W(11 - 7D \times 12)$
$W(8 - 6D \times 12 - \theta \times 12)$
$W(7 - 6D \times 12)$
$W(4 - 5D \times 12 - \theta \times 12)$
$W(3\ 5D \times 12)$
$Q(2 - 4D \times 12 - \times 12)$
$Q(1 - 4D \times 12)$
$P(2 - 3D \times 12 - \theta \times 12)$
$P(1 - 3D \times 12)$
$W(10 - 2D \times 12 - \theta \times 12)$
$W(9 - 2D \times 12)$
$W(6 - D \times 12 - \theta \times 12)$
$W(5 - D \times 12)$ W(2−θ×12)
W(1)
where D and θ are:
D = 17 record blocks (= 17×12 symbols)
θ = 9D (= 9×17 record blocks = 9×17×12 symbols)
The synchronizing signal word includes addresses of respective record blocks (block addresses).

Figure 13:
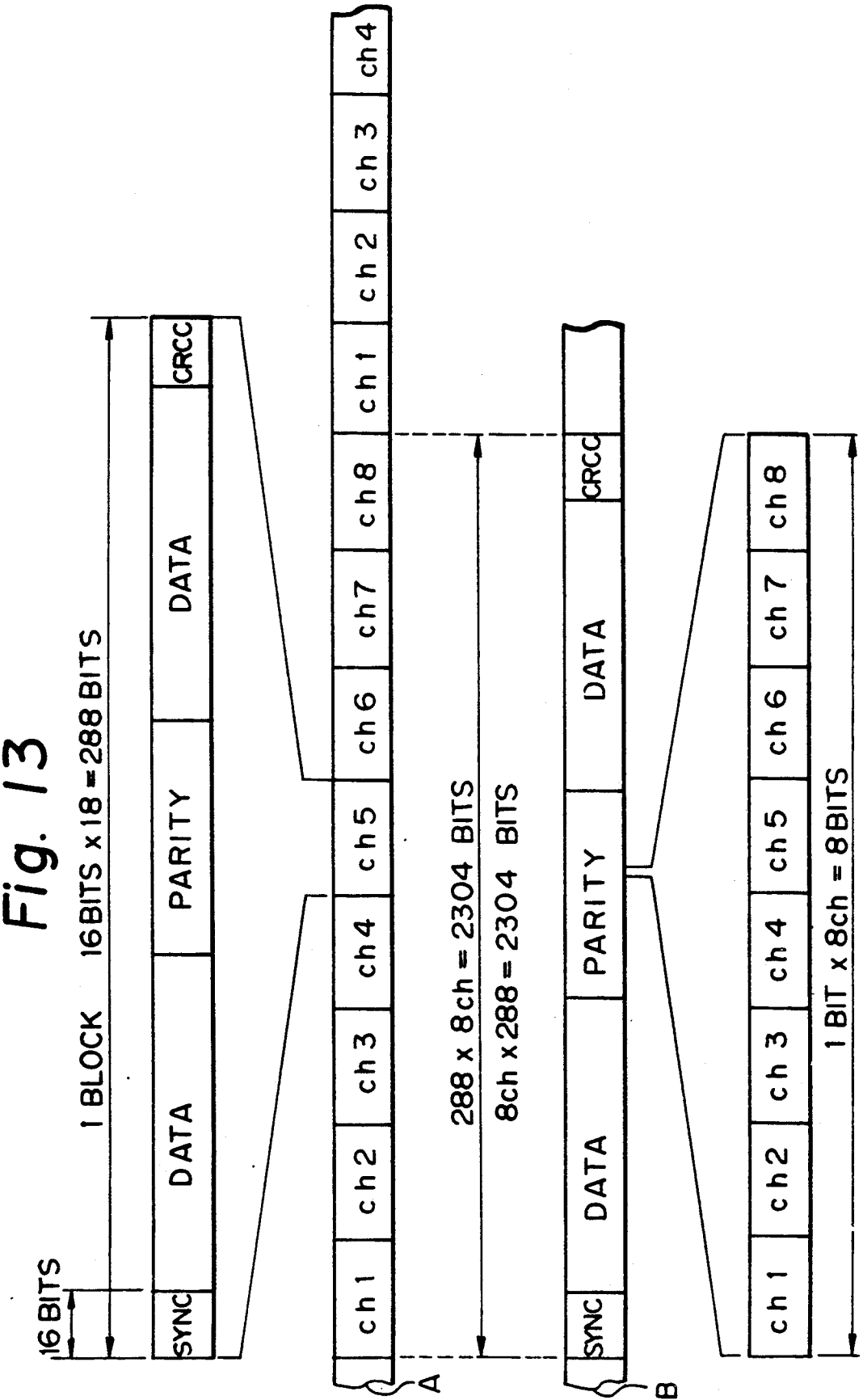
FIG. 13 is a schematic view for use in an explanation of data rearrangement for pulse-train recording.

The pulse-train-mode recording is briefly explained here. The pulse-train-mode recording is a process used in recording multichannel signals in respective parallel tracks to remove interference (crosstalk) between adjacent tracks, and it is configured to feed a signal current, by time-dividing one bit of the recorded signal by the number of channels. Therefore, signal current never flows concurrently in two or more channels. As a result, the information signal such as signal A in FIG. 13, which is time-divided in block units, must be changed to a signal such as signal B, which is channel-time-divided in bit units. Such data rearrangement is performed in the pulse-train-mode recording rearrangement memory 77 (FIG. 14) and its peripheral circuitry. FIG. 13 shows an example of time-division processing into 8 channels $ch_1$ to $ch_8$. Blocks respectively corresponding to 8 channels are assembled. Signal A has an arrangement including 2304 bits (i.e., 288 bits per channel × 8 channels). The bits for each channel define the synchronizing signal word, data word, parity code, another data word, and the CRC code. Signal A is rearranged into a channel-time-divided form to form signal B of 2304 (8×288) bits wherein single bits of each channel are arranged consecutively.

In this embodiment, an error caused by a tracking adjustment is corrected upon the data rearrangement for the pulse-train-mode recording.

Figure 14:
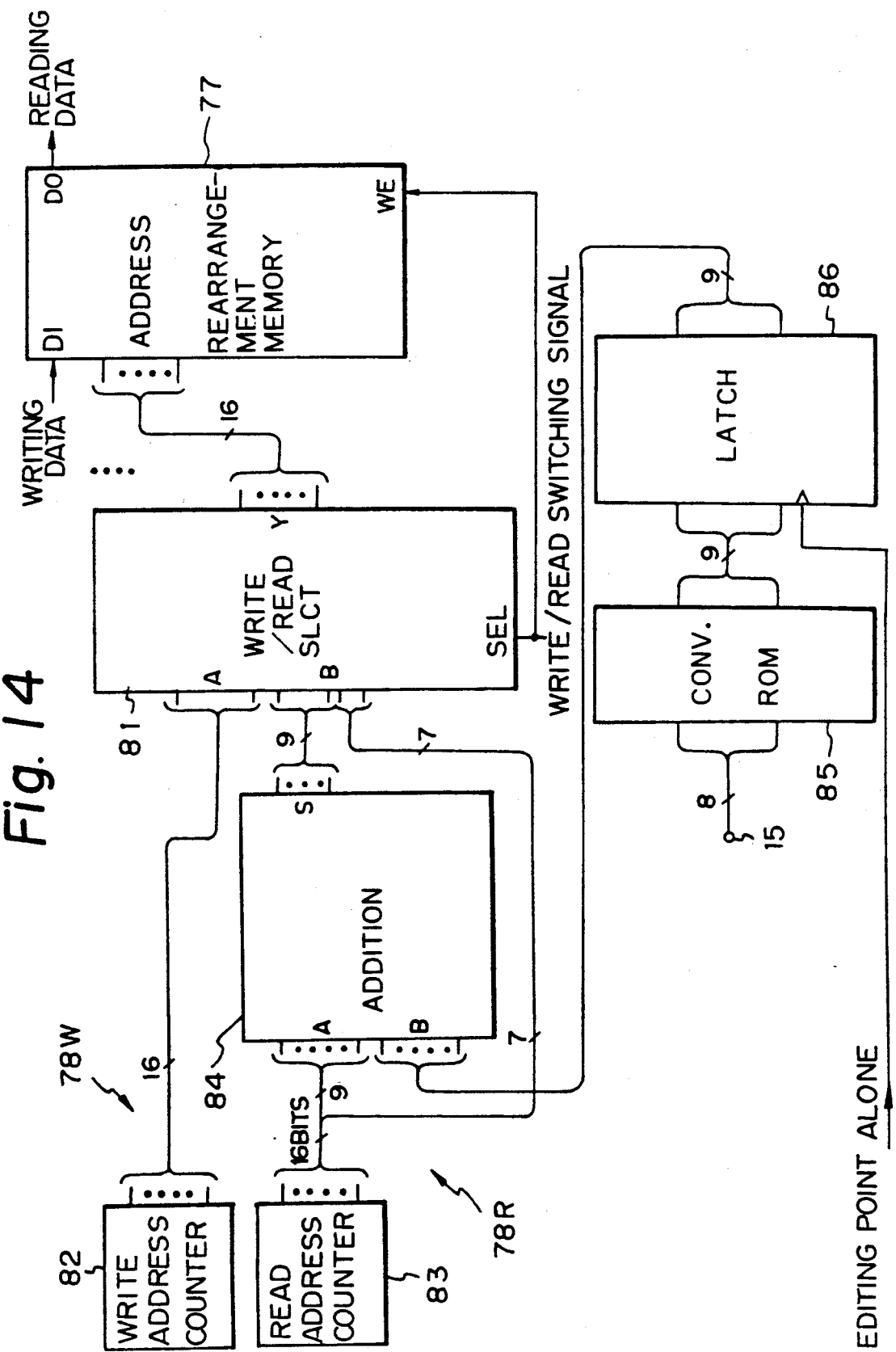
FIG. 14 is a block diagram showing a circuit for data rearrangement and error correction.

FIG. 14 shows an example of the peripheral circuitry for the pulse-train-mode recording rearrangement memory 77 of FIG. 10B.

In FIG. 14, a write address and a read address for the pulse-train-mode recording rearrangement memory 77 are supplied through a write/read selector 81. A write address of 16 bits is supplied from a write address counter 82 to a write address input terminal A of the write/read selector 81. An output of 16 bits is supplied from a read address counter 83. Of these, the upper significant 9 bits are supplied to input A of an adder 84 and the lower significant 7 bits to the lower significant part of the input B of the write/read selector 81. The adder 84 consists, for example, of an adder read only memory (ROM) which is also supplied at its input B with 9-bit data from a latch 86 indicative of the amount of error caused by tracking adjustment to add it to upper significant 9 bits of the read address from the read address counter 83. Error data of 8 bits from the terminal 15 is the unit of, for example, 1/18 block, and the error data is supplied to a converter ROM 85. Error data of 9 bits is obtained from the convertor ROM 85. Upper significant four bits among the 9 bits indicate the amount of error of a block unit, and lower significant five bits indicate the amount of error of 1/18 of a block unit. The convertor ROM 85 forms data of 9 bits which can be added via latch 86 and input B of the adder 84 to upper significant 9 bits of the read address. The latch circuit 86 is supplied with a latch pulse generated in relation to the selected edit points.

The data that is written into the rearrangement memory 77 according to the write address from the address counter 82 is designated in the sequence of a block, channel and bit from the upper significant side and is read out by the read address from the read address counter 83 in the sequence of the block, bit and channel from the upper significant side. In this fashion, simultaneously with the data rearrangement shown in FIG. 13, the error is corrected by the control of the read address by the adder circuit 84 in response to the error. Therefore, the continuity between the newly recorded (rewritten) portion and the originally recorded base portion is improved, and error generation upon subsequent reproduction is avoided.

According to the invention, upon recording a new digital signal for editing purposes by controlling the timing of the recorded data in response to a deviation caused by a tracking adjustment, the continuity between the originally recorded signal and the newly recorded signal can be maintained. Therefore, when reproducing a record medium for which editing has been effected, the continuity of addresses is maintained and errors are avoided.

Further, since the invention does not employ the prior proposed system which corrects the record data timing in response to an error between the reproduced block address and the reference block address, the invention can prevent the accumulation of errors, if any, related to the distance between the recording head and the reproducing head, when editing is repeated.

The present invention is subject to many modifications and changes in detail, and those skilled in the art will understand that variations may be made in the disclosed embodiments without departing from the spirit and scope of the invention. Accordingly, all matter contained in the foregoing description or shown in the accompanying drawings shall be interpreted as illustrative and not in a limiting sense, the invention being defined by the appended claims.

What is claimed is:

1. Apparatus for recording a video signal and an audio signal on a magnetic tape and for reproducing the video signal and the audio signal therefrom, said video signal being recorded on oblique and successive parallel video tracks formed on said magnetic tape by at least one video head moving in scan orbits and said audio signal being recorded on at least one audio track formed in a longitudinal direction of said tape, said apparatus comprising:

adjusting means for effecting a speed adjustment of said magnetic tape in its longitudinal direction so as to ensure that, during reproduction of the video signal, the video tracks coincide with the scan orbits;

first and second transducing heads located at positions separated from each other in the longitudinal direction of said tape by a given distance for respectively reproducing and recording the longitudinally recorded audio signal, said given distance being nominally predetermined but subject to variation;

processing means connected to said first transducing head for processing an audio signal reproduced from an original recording and for supplying the same to said second transducing head for making a new recording to be spliced to said original recording as a continuation thereof; and control means responsive to said adjusting means for controlling said processing means so that recording of said reproduced audio signal by said second transducing head can be shifted to maintain a prescribed relation between said original recording and said new recording notwithstanding a variation in said given distance.

2. Apparatus according to claim 1 wherein said prescribed relation is spatial.

3. Apparatus according to claim 1 wherein said prescribed relation is temporal.

4. Apparatus according to claim 1 wherein said prescribed relation is such as to produce a seamless interface between said original and new recordings.

5. Apparatus for recording a video signal and an audio signal on a magnetic tape and for reproducing the video signal and the audio signal therefrom, said video signal being recorded on oblique and successive parallel video tracks formed on said magnetic tape by at least one video head moving in scan orbits and said audio signal being recorded on at least one audio track formed in a longitudinal direction of said tape, said apparatus comprising:

adjusting means for effecting a speed adjustment of said magnetic tape in its longitudinal direction so as to ensure that, during reproduction of the video signal, the video tracks coincide with the scan orbits;

first and second transducing heads located at positions separated from each other in the longitudinal direction of said tape by a given distance for respectively reproducing and recording the audio signal, and given distance being nominally predetermined but subject to variation;

processing means connected to said first transducing head for processing an audio signal reproduced from an original recording and for supplying the same to said second transducing head for making a new recording to be supplied to said original recording as a continuation thereof; and control means responsive to said adjusting means for controlling said processing means so that recording of said reproduced audio signal by said second transducing head can be shifted to maintain a prescribed relation between said original recording and said new recording notwithstanding a variation in said given distance;

in which a control track signal is recorded on said magnetic tape and said adjusting means comprises:

a tape position control switch having a setting used when tracking adjustment is to be effected and producing a switch output signal;

first and second magnetic heads located at positions separated from each other in the longitudinal direction of said tape by said given distance for reproducing the control track signal;

means for supplying a reference signal;

a first detection circuit for detecting a phase difference between said reference signal and said control track signal as reproduced by said first magnetic head and producing a first detection output signal;

a second detection circuit for detection a phase difference between said control track signal as reproduced by said first and second magnetic heads and producing a second detection output signal; and a combining circuit for combining the output signals of said tape position control switch and said first and second detection circuits.

6. Apparatus according to claim 5 in which said processing means includes a memory circuit for storing said audio signal, said memory circuit having a read address controlled in response to an output signal of said combining circuit.

7. A servo system for controlling transport of a record medium in which video, audio, and control track signals are recorded and from which the video, audio, and control track signals are reproduced, the video signal being recorded on and reproduced from slant tracks and the audio and control track signals being recorded on and reproduced from longitudinal tracks, and said servo system comprising:

a first head for reproducing said control track signal at a first location;

a second head for reproducing said control track signal at a second location, said second location being at a given distance from said first location, said given distance being nominally predetermined but subject to variation;

a tracking control device for controlling transport of said record medium; and a first generating means connected to said first and second heads for generating a phase difference between the control track signal as reproduced by said first and second heads a second generating means responsive to said first generating means, for generating a mean value of the phase difference, and means for supplying the mean value as a control signal for controlling said tracking control device.

* * * * *